United States Patent

[11] 3,617,841

[72] Inventor  Harrison D. Brailsford
               670 Milton Road, Rye, N.Y. 10580
[21] Appl. No. 772,112
[22] Filed     Oct. 31, 1968
[45] Patented  Nov. 2, 1971

[54] SELF-SYNCHRONIZING DIRECT CURRENT BRUSHLESS MOTOR
     14 Claims, 6 Drawing Figs.
[52] U.S. Cl. ................................................. 318/254,
     318/310, 318/329, 318/449, 318/451
[51] Int. Cl. ................................................... H02k 29/00
[50] Field of Search ........................................ 310/26, 35,
     36; 318/138, 254, 310, 329, 449, 451

[56] References Cited
     UNITED STATES PATENTS

| | | | |
|---|---|---|---|
| 3,497,782 | 2/1970 | Petrides | 318/138 |
| 3,161,813 | 12/1964 | DeWolf et al. | 318/129 X |
| 3,214,662 | 10/1965 | DeWolf | 318/138 X |
| 3,246,224 | 4/1966 | Helfner | 318/329 |
| 3,250,066 | 5/1966 | Engelhardt et al. | 318/138 X |
| 3,375,423 | 3/1968 | Mayer et al. | 318/138 |
| 3,454,856 | 7/1969 | Jones | 318/138 |
| 3,470,433 | 9/1969 | Siefert | 318/138 |

Primary Examiner—G. R. Simmons
Attorney—Donald P. Gillette

ABSTRACT: The disclosed invention is a synchronized motor operated by direct current and having a synchronizer in the form of a mechanical oscillator. The motor has a permanent magnet rotor and stator coils commutated by solid-state elements to produce magnetic pulses properly phased to keep the rotor turning. The mechanical oscillator has a member that oscillates at a natural frequency in response to the interaction of a permanent magnet and the pulsed field of a driving coil. The driving coil is connected to the stator coil section of the motor to receive a pulse, or oscillatory, driving signal therefrom. A pickup coil is energized by the oscillating member to produce a feedback signal at the natural frequency of the oscillating member, and this feedback signal is connected to the solid-state elements to control the timing of magnetic pulses in the stator coils thereby synchronizing the rotor speed in step with the natural frequency of the mechanical oscillator.

INVENTOR.
Harrison D Brailsford

By Donald P Elliott
ATTORNEY

PATENTED NOV 2 1971 3,617,841
SHEET 2 OF 2
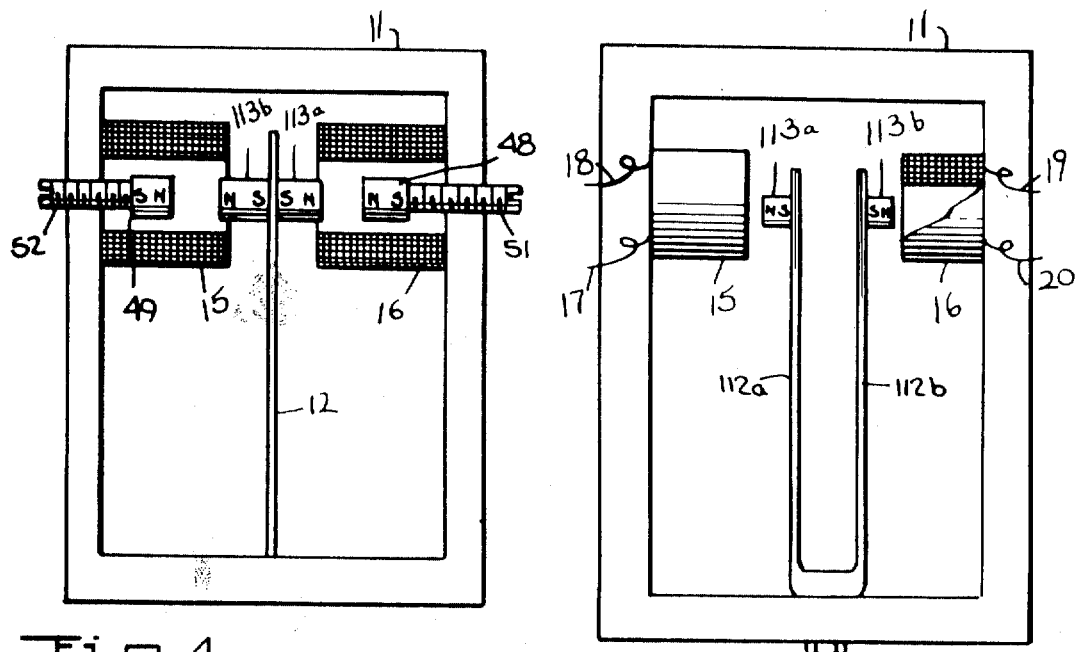
Fig. 4.
Fig. 5.
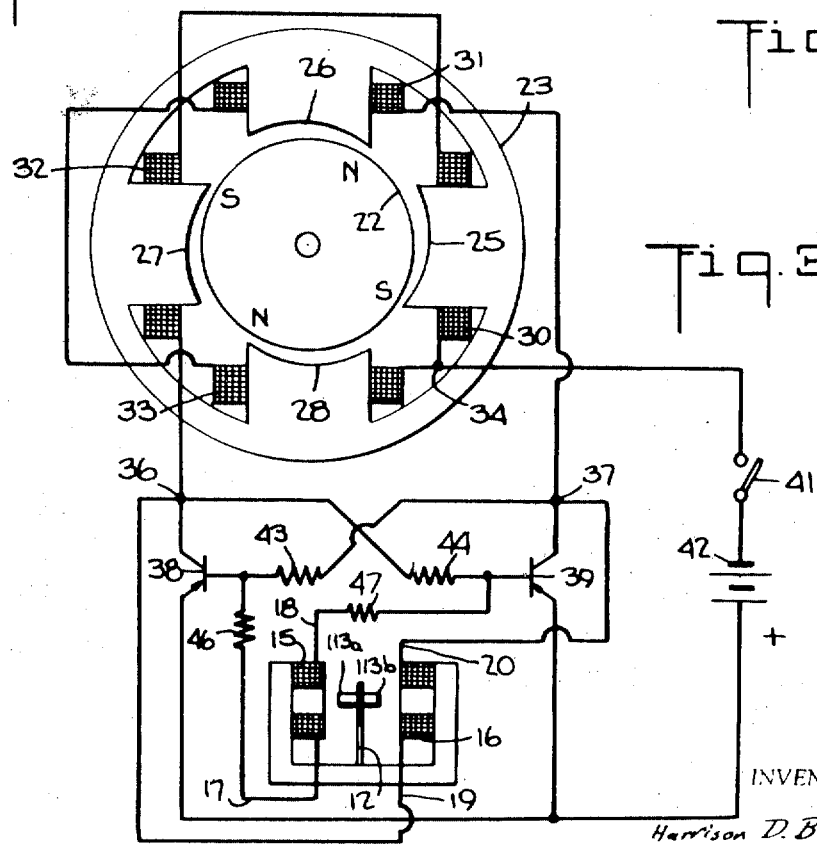
Fig. 3.
INVENTOR.
Harrison D. Brailsford
By Donald P. Willette
ATTORNEY

3,617,841

SELF-SYNCHRONIZING DIRECT CURRENT BRUSHLESS MOTOR

This invention relates to brushless, transistor commutated direct current motors and particularly to motors having the characteristic of operating at constant speed regardless of normal variations in the voltage of the power supply, or changes in the mechanical loads on the motors, or both voltage and load changes.

In my U.S. Pat. No. 3,264,583 reference is made to the fact that the motor described therein is capable of being synchronized to an operating speed determined by a suitable electrical signal which could be very weak inasmuch as the required synchronizing power is quite small. The present invention relates to a synchronizing signal generator that may be built into the framework of the motor. This signal generator comprises an armature with a permanent magnet thereon which oscillates back and forth adjacent to two coils, one of which is connected to the motor to derive an alternating current driving signal therefrom to move the permanent magnet back and forth, an the other of which has an electrical signal generated in it as the permanent magnet of the armature oscillates. The latter coil is connected to synchronizing input terminals of the motor to supply thereto the signal generated by the oscillating permanent magnet and by properly selecting the oscillating permanent magnet and by properly selecting the oscillatory parameters, such as the mass and spring stiffness, of the armature, the latter will oscillate at a predetermined resonant frequency and will only permit a signal having that frequency to be applied to the synchronizing terminals of the motor.

A principal object of this invention is to provide a simple and convenient synchronizing signal source especially adapted to control the speed of direct current motors commutated by solid-state devices. Further objects will become apparent from the following specification together with the drawings in which:

FIG. 3 is a schematic diagram of a motor together with the synchronizing signal generator of FIG. 2;

FIG. 4 shows a further modification of the invention to permit adjustment of the frequency to which the synchronizing signal source is tuned;

FIG. 5 is still another embodiment of the invention; and

Figure 1:
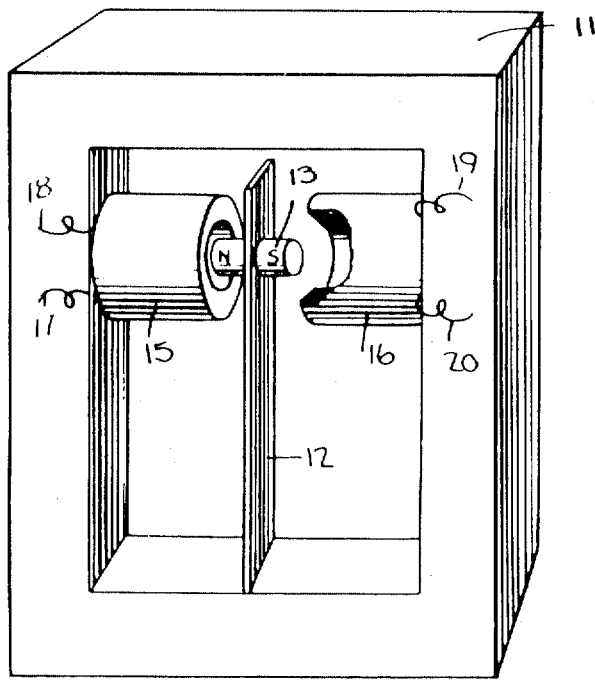
FIG. 1 shows a simple embodiment of the synchronizing signal generator of this invention.

The embodiment in FIG. 1 comprises a rigid frame 11 of any suitable nonresonant material, such as brass, with a reed 12 of spring material, such as heat-treated beryllium copper or spring steel, attached to one of its legs. At or about the free end of this reed is attached a small bar magnet 13, which, in FIG. 1 extends through a hole in the reed and is held securely by the reed. A pair of coils 15 and 16, which may be in the form of hollow solenoids, are rigidly attached to the side members of frame 11 so that the magnet 13 is supported in the center between the openings of the two coils, and preferably in the same plane with the coils.

It is an established rule of physics and well-understood in the art that the reed and magnet assembly is an oscillating, or vibrating, body which, if excited, will vibrate at its natural, or resonant, frequency determined by the mass-compliance ratio of the magnet 13, in which most of the mass is concentrated, and the reed 12, which is designed to have a certain compliance. In order to set the reed into motion, one of the coils, for example, coil 16, may be energized by means of an alternating current applied to its terminals 19 and 20. This current will produce an alternating magnetic field in the vicinity of coil 16, and if the frequency of the alternating current starts at a low value and gradually increases, a value will eventually be reached at which the frequency of the applied alternating current will coincide with the natural resonant frequency of the reset assembly. At, or close to this resonant frequency, the reed 12 will be excited into vibration, the amplitude of which will reach a maximum at the natural resonant frequency of the reed. If, however, the frequency of the applied, or driving, current is further increased, the oscillations of the reed 12 will diminish and stop, since, due to the basic law of physics involved, the reed will not freely vibrate at a frequency much above its own natural resonant point.

When the reed is vibrating, the magnetic flux from the end, in this case the north pole, of magnet 13 which is closer to the coil 15 will generate an electric current in coil 15. Since the frequency of the current thus generated will be determined by the vibrational frequency of the assembly comprising reed 12 and magnet 13, and this will be the natural resonant frequency of the assembly, it will be seen that the device acts as an electromechanical band-pass filter. By taking care to reduce frictional and other losses to a minimum, the bandwidth may be reduced so that, for all intents and purposes, the filter permits only a single frequency to pass through.

Figure 2:
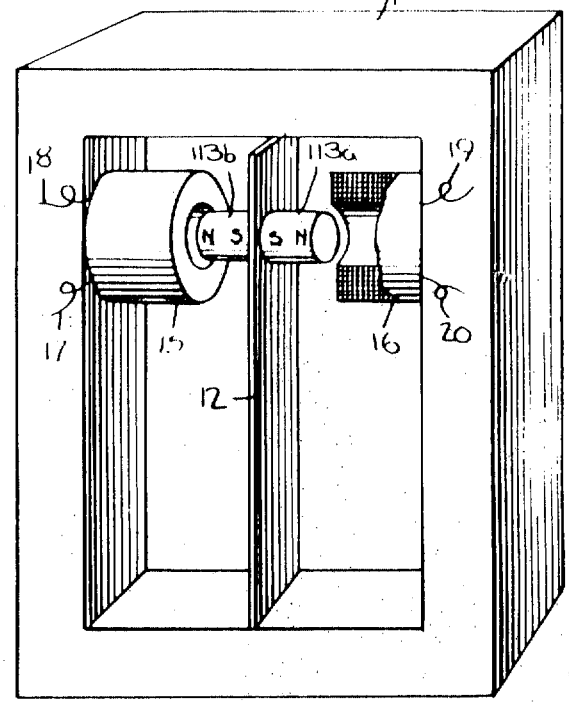
FIG. 2 shows a modification of the signal generator of FIG. 1.

In FIG. 2 a somewhat more sophisticated vibrating assembly is shown which differs from that of FIG. 1 chiefly in having a magnet that is divided into two parts 113a and 113b, each having a north and south pole and placed so that their magnetic fields oppose each other. This furnishes additional shielding between coils 15 and 16 with the result that the device is correspondingly more selective in its pass frequency, which means that a signal will be generated in the coil 15 only when coil 16 is energized by an alternating current having a frequency very close to the natural resonant frequency of the reed assembly.

Operation of the device of FIGS. 1 and 2 will be described as it is applied to a basic motor structure of the type shown in FIG. 3 corresponding to the embodiments described in U.S. Pat. No. 3,264,583. The motor of FIG. 3 is of multipole construction with an armature 22 that has two poles indicated by the letters N diametrically opposite to each other and two south poles indicated by the letters S diametrically opposite to each other and halfway between the two north poles. The stator structure is in the form of a soft iron ring 23 with four salient poles having pole faces 25, 26, 27, and 28 so formed as to leave tapering air gaps between each of the pole faces and the periphery of the permanently magnetized armature 22, the taper being such that the width of each gap is smallest in the direction in which the armature will normally rotate. The windings of the motor are electrically equivalent to a single center-tapped winding but are divided into four sections 30 to 33 which are wound, respectively, on the salient poles 25 to 28, with one set of windings 30 and 32 connected in series and another set of windings 31 and 33 also connected in series and joined to the first set by a common junction, or center tap, 34. The outer terminals of the two divided windings, respectively, are indicated by reference characters 36 and 37 and are connected to the collector electrodes of a pair of transistors 38 and 39, respectively. A switch 41 connects the center tap 34 to one pole of a battery 42 the other pole of which is connected to the emitter electrodes of both of the transistors. Feedback is provided in one direction by an impedance 43 from the collector of transistor 39 to the base of transistor 38 and in the other direction by an impedance 44 connected from the collector of transistor 38 to the base of transistor 39.

When the switch 41 is closed, one of the transistors 38 or 39 becomes conductive. Assuming that the transistor 38 is the one that becomes conductive initially, current will flow from the battery 42 through the emitter-collector of the transistor 38 and through the windings 3 and 30. The windings 32 and 30 must be wound in opposite directions, so that both pole faces 25 and 27 become magnetized with south magnetic polarity and at the same time the poles 2 and 28 assume the north magnetic polarity. There is an angular displacement between the magnetic axis of the armature 22 in its rest position and the magnetic axis the poles 25 and 28 established when the switch 41 is closed. Because of this angle, the armature 22 must move when the magnetic field is set up in the poles 25 and 28 by current flowing in either the coils 30 and 32 or coils 31 and 33, since the magnetic poles of the armature will attempt to align themselves with the poles of the field structure so as to establish maximum magnetic flux linkage between the armature and stator magnetic poles. The direction of motion of the armature 22 under the conditions postulated is in a clockwise direction.

As the armature 22 rotates in the clockwise direction, the magnetic field of its poles n and s induce alternating voltages across the coils 30 and 33. These voltages cause the transistor 38 to become nonconductive and the transistor 39 to become conductive at the proper time to keep the armature 22 rotating. Because of the four-pole structure there will be four motive impulses per revolution, with each of the coils 30 and 33 serving, alternately, as driving windings and as pickup coils, thus eliminating the necessity for separate pickup coils.

The terminals 19 and 20 of the driving coil 16 of the synchronizing signal generator are connected to terminals 36 and 37 so as to derive an alternating current therefrom. The terminals 17 and 18 of the feedback coil 15 are connected by a pair of impedances 46 and 47 to the bases of the transistors 38 and 39 respectively. Now when the motor is started by closing the switch 41, it accelerates in speed, and the frequency of the alternating voltage generated at the terminals 36 and 37, being a function of the speed of the rotor 22, increases as the motor accelerates. This produces a more or less gradually increasing frequency signal to be applied through the terminals 19 and 20 to the driving coil 16. When this frequency approaches sufficiently closely to the natural resonant frequency of the reed assembly comprising the reed 12 and the magnets 113a and 113b, the reed assembly will be excited into vibration and will generate a voltage of the same frequency in the coil 15, which may be referred to as a feedback, or control coil.

When the motor is running, an alternating voltage, of nominally square waveform, is generated between the two bases of the transistors 38 and 39 at a frequency which corresponds to the rate of rotation of the armature. By applying an alternating voltage having an amplitude equal to or slightly exceeding that produced by feedback through the resistors 43 and 44 alone, the motor will lock into synchronism with and run slave to the externally applied signal even though the motor is subjected, to wide variations in the applied load or in voltage of battery 42 or both. The magnitude of the externally applied voltage may be only a small fraction of that produced by the battery 42. Typical values for a motor running on a battery of 26 volts and drawing 3 watts of power would be a synchronizing signal from the terminals 17 and 18 of approximately 0.5 volts at less than 10 milliwatts. In other words the motor under this condition behaves like an AC synchronous motor but draws its running power from the DC battery 42. The accuracy with which the running speed of the motor is maintained at a constant value will be entirely a function of the precision or accuracy of the vibrating reed assembly.

A further refinement of the synchronizing signal generator is shown in FIG. 4 which is generally similar to FIG. 2 with the addition of two small bar magnets 48 and 49 mounted on the ends of adjustment screws 51 and 52, respectively. These magnets are magnetically polarized, as shown, so that they repel the proximal magnetic poles of the magnets 113a and 113b in order to provide a frequency adjustment for the natural frequency of the vibrating reed assembly. As the magnets 48 and 49 are moved in toward the armature magnets 113a and 113b, the same effect is created as if the reed 12 were made stiffer, or less compliant, and as the compliance of the reed is decreased, the resonant frequency of the reed assembly will be increased.

Other forms of reed assembly may be used in place of those shown in FIGS. 1 through 4. For example, in FIG. 5 the reed is in the form of a U-shaped tuning fork consisting of tynes 112a and 112b joined together at the bottom end. One of the magnets 113a is mounted on tyne 112a while the other magnet 113b is mounted on tyne 112b. As is well-known, a single tyne of a tuning fork cannot vibrate alone and thus when tyne 112b is driven into vibration by an alternating current signal applied to the driving coil 16, the other tyne 112a will begin to vibrate in harmony therewith and will cause the magnet 113a mounted on its end to produce a signal of corresponding frequency in the feedback coil 15. The advantage of using a two-tyne tuning fork in place of a single reed is that it further narrows the band-pass of the oscillating reed assembly so that the rotational speed of the motor is governed to a high degree of accuracy.

Figure 6:
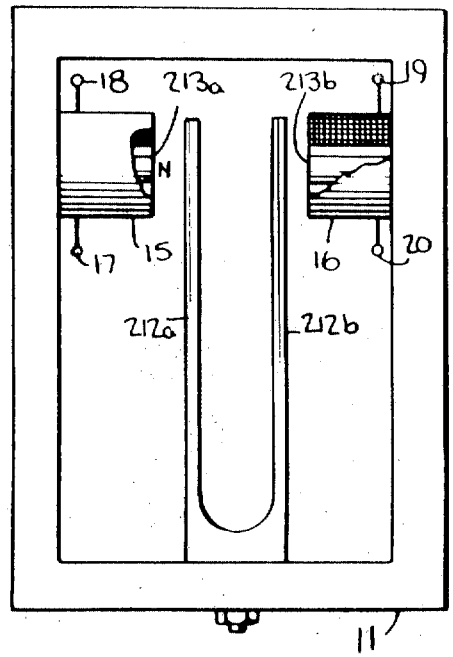
FIG. 6 is a further modification of the invention with stationary magnets.

In FIG. 6 the vibrating, or oscillating, assembly comprises simply a tuning fork having two tynes 212a and 212b of ferromagnetic material joined together at the bottom end and attached to the frame 11, which may be either of magnetic or nonmagnetic material. A pair of stationary magnets 213a and 213b is mounted rigidly within the coils 15 and 16, rather than being mounted on the oscillating reeds, as in the other embodiments. These magnets are placed so that their proximal poles are of the same magnetic polarity, in order to provide greater isolation for the coils 15 and 16, and so that their magnetic fields link the tynes 212a and 212b.

In operation the permanent magnets 213a and 213b apply an initial, fixed magnetic bias to the tynes 212a and 212b. The electrical signal applied to the terminals 19 and 20 produces a magnetic field which, in effect, modulates the steady magnetic field of the magnet 213b thus changing the attraction for the tyne 212b and setting the latter, and consequently, the other tyne 212a to oscillating. If the frequency of the signal applied to the the terminals 19 and 20 is sufficiently close to the natural resonant frequency of the tuning fork both of the tynes 212a and 212b will continue to oscillate, and tyne 212a, being of magnetic material, will change the reluctance of the magnetic path for flux emanating from magnet 213a, thus in effect changing the flux linking the coil 15 and inducing a voltage across the terminals 17 and 18 thereof. This voltage may be applied as in any of the other embodiments to control the rotational speed of a motor.

What is claimed is:

1. The combination comprising:
   A. A motor comprising:
      1. Main coil means,
      2. A rotor,
      3. Solid-state commutating means comprising output terminals connected to said coil means to permit current pulses to energize said coil means in proper phase to keep said rotor turning; and
   B. A mechanical oscillator comprising:
      1. An oscillating member magnetically separated from said rotor and having a natural frequency,
      2. A permanent magnet,
      3. A driving coil directly connected to said output terminals of said solid-state means to be energized thereby, said impulse signal in said driving coil producing an impulse magnetic field which interacts with the magnetic field of said permanent magnet to cause said oscillating member to oscillate,
      4. A pickup coil energized by said oscillating member to produce a feedback signal at said natural frequency, and
      5. A connection from said pickup coil to said solid-state means to control the commutation of said current pulses in synchronous relation with said feedback signal.

2. The invention as defined in claim 1 in which said permanent magnet is mounted on said oscillating member.

3. The invention as defined in claim 2 in which said driving coil and said pickup coil are mounted on opposite sides of said oscillating member; and said permanent magnet is divided into first and second parts and mounted transversely on said oscillating member with like poles of one polarity facing each other and like poles of the opposite polarity facing said driving and pickup coils.

4. The invention as defined in claim 3 comprising, in addition: first and second permanent stationary magnets oriented so that their fields oppose, respectively, the fields of said first and second parts, whereby the movement of said oscillating member is opposed.

5. The invention as defined in claim 4 comprising, in addition: adjustable mounting means for said stationary magnets to move them toward or away from said first and second parts to change said natural frequency is adjusted.

6. The invention as defined in claim 4 in which said oscillating member comprises a single, flat reed flexible substantially only in a direction toward and away from said driving and pickup coils.

7. The invention as defined in claim 4 in which said driving and pickup coils are solenoid coils substantially axially aligned with each other and with said first and second parts.

8. The invention as defined in claim 7 in which said first and second stationary magnets are located within said driving and pickup coils, respectively.

9. The invention as defined in claim 3 in which said oscillating member comprises a tuning fork having two tynes and said tynes facing said driving coil and said second part of said permanent magnet is mounted on the other of said tynes facing said pickup coil.

10. The invention as defined in claim 1 in which:
A. Said permanent magnet is divided into:
 1. A first part stationarily mounted substantially concentrically with respect to said driving coil whereby the field of said first part substantially overlaps and is in opposition to the field of said driving coil when said driving coil is energized, and
 2. A second part stationarily mounted substantially concentrically with respect to said pickup coil; and
B. Said oscillating member comprises a two-tyned tuning fork of ferromagnetic material to be actuated by the combined fields of said driving coil and said first part of said permanent magnet and to effect an oscillating change in flux from said second part of said permanent magnet linking said pickup coil.

11. The invention as described in claim 1 in which:
A. Said solid-state means comprise:
 1. First and second transistors, each comprising
  a. A base electrode,
  b. An emitter electrode, and
  c. A collector electrode, said emitter and collector electrodes comprising an emitter-collector output circuit,
 2. A feedback circuit connecting the output circuit of said first transistor to the base of said second transistor and the output circuit of said second transistor to the base of said first transistor, said main coil means comprising first and second coils connected to said output circuits of said first and second transistors, respectively; and
B. Said feedback coil is connected to said base electrodes of both of said transistors.

12. The combination comprising:
A. A circuit comprising:
 1. First and second transistors, each comprising:
  a. a base electrode,
  b. an emitter electrode, and
  c. a collector electrode, said emitter and collector comprising an emitter-collector output circuit,
 2. First and second coils connected, respectively, in series with the output circuits of said first and second transistors,
 3. A common junction to connect said first and second coils to a source of direct current to supply current impulses alternately to said first and second coils under the control of said first and second transistors, and
B. A mechanical oscillator comprising:
 1. An oscillating member having a natural frequency,
 2. A permanent magnet,
 3. A driving coil directly connected to said output circuits of said first and second transistors to receive an impulse signal at a frequency corresponding to the frequency of said current impulses, said impulse signal in said driving coil producing an impulse magnetic field which interacts with the magnetic field of said permanent magnet to cause said oscillating member to oscillate,
 4. A pickup coil energized by said oscillating member to produce a feedback signal at said natural frequency, and
 5. A connection from said pickup coil to said bases of said transistors to make the output circuits of transistors alternately conductive in synchronous relation with said feedback signal to control the repetition rate of said current impulses in said first and second coils.

13. The invention as described in claim 12 in which said feedback coil is connected in series between said base electrodes.

14. The invention as described in claim 12 in which said first and second coils are connected in series with collector electrodes of said first and second transistors, respectively, and said driving coil is connected in series from the collector electrode of said first transistor to the collector electrode of second transistor.

* * * * *